United States Patent Office 3,281,285
Patented Oct. 25, 1966

3,281,285
THIOUREA STABILIZED NON-AQUEOUS PHOSPHATIZING COMPOSITION AND METHOD
Donald H. Campbell, Niagara-on-the-Lake, Ontario, Canada, assignor to Hooker Chemical Corporation, Niagara Falls, N.Y., a corporation of New York
No Drawing. Filed Nov. 13, 1962, Ser. No. 237,365
12 Claims. (Cl. 148—6.17)

This invention relates to stable chlorinated hydrocarbon solvents and more particularly relates to chlorinated hydrocarbon solvents which are stable against decomposition in acidic solutions containing phosphate ions.

The chlorinated hydrocarbon solvents, such as trichloroethylene, are used widely in industry for many purposes. For example, these materials are frequently used as solvents in vapor degreasing processes, as dry cleaning solvents, as solvents in ultrasonic cleaners and as heat transfer media. These materials, and in particular, trichloroethylene, are reactive chemicals and frequently in the course of their use they are exposed to air, light, heat and a variety of metals, all of which act to catalyze the chemical reactivity of the materials, and promote their decomposition. Accordingly, in order to utilize these chlorinated hydrocarbon solvents in many of the above applications, they are sometimes stabilized by the addition of minor amounts of a compound or compounds which will inhibit their decomposition under the conditions of use. For this purpose, numerous stabilizing compounds and compositions have been developed for the chlorinated hydrocarbon solvents, which stabilizers are well known to those in the art. Exemplary of some materials which have been used as stabilizers, particularly for trichloroethylene, are triethylamine, thymol, pentaphen, phenol, and paratertiarybutyl phenol. For the most part, these materials, as well as numerous others, have been found to be quite effective in stabilizing the chlorinated hydrocarbon solvents, in the applications for which they have been principally used in the past. Where, however, chlorinated hydrocarbon solvents, such as trichloroethylene, are used in acidic solutions containing phosphate ions, as for example when they are employed as solvents in the preparation of a phosphatizing solution, the conventional stabilizers have been found to be substantially ineffective. In such environments, i.e., acidic solutions containing phosphate ions, the chlorinated hydrocarbon solvents can decompose and then must be replaced, thereby adding significantly to the cost of an operation, such as phosphatizing.

Although the exact mechanisms by which these chlorinated hydrocarbon solvents break down are not known, it is generally believed that the major factors in the decomposition are oxidation, metal catalyzed condensations, and acidic decomposition. In general, this decomposition leads to the ultimate formation of undesirable products which include phosgene, dichloroacetic acid, and hydrogen chloride. Not only is the decomposition of these chlorinated hydrocarbon solvents to the above products detrimental to the process which is being carried out, such as phosphatizing, but, additionally, the materials ultimately formed, and in particular the hydrogen chloride, cause excessive corrosion of the equipment which is being used and of the parts which are being processed. Accordingly, the need for a stabilizing system which will inhibit the major decomposition reactions of the chlorinated hydrocarbon solvents in acidic solutions containing phosphate ions is established.

It is, therefore, an object of the present invention to provide a novel stable composition of a chlorinated hydrocarbon solvent in an acidic solution containing phosphate ions.

Another object of the present invention is to provide an improved, stabilized substantially anhydrous phosphatizing composition.

A further object of the present invention is to provide an effective method of stabilizing chlorinated hydrocarbon solvents against decomposition in acidic solutions containing phosphate ions.

Still another object of the present invention is to provide an improved method of phosphatizing metals, wherein a stable substantially non-aqueous phosphatizing solution is utilized.

These and other objects will become apparent to those skilled in the art from the description of the invention which follows.

It has now been found in the practice of the present invention that a chlorinated hydrocarbon solvent in an acidic solution containing phosphate in the form of phosphate ions, is effectively stabilized against decomposition by the addition thereto of a stabilizing proportion of thiourea. The thus-stabilized chlorinated hydrocarbon has been found to be particularly suitable for use as the solvent in preparing non-aqueous phosphatizing solutions; however, it may also be used in other acidic solutions containing phosphate ions such as acidic paint or other film forming compositions which also containing phosphate ions. For the purpose of illustrating the present invention, primary reference will be made hereinafter to non-aqueous phosphatizing solutions containing the stabilized chlorinated hydrocarbon solvents. Such reference, however, is to be taken merely as being exemplary of the present invention and not as the limitation thereof.

The amount of thiourea which is added to the chlorinated hydrocarbon solvent containing composition will be at least that amount which is effective to stabilize the chlorinated hydrocarbon solvent against the decomposition effected by the acidic solution containing phosphate ions in which the chlorinated hydrocarbon solvent is dissolved. Generally, this amount of thiourea will be within the range of about 0.0001 to about 0.1 percent by weight of the chlorinated hydrocarbon solvent. It will be appreciated, however, that greater or lesser amounts of the thiourea may be employed, the specific amount desirable being readily determinable in each instance.

In this regard, it is to be noted that the solubility of thiourea in chlorinated hydrocarbons is not great. Accordingly, when the amount of thiourea necessary to effect stabilization is greater than the amount which is soluble in the chlorinated hydrocarbon, there should be included in the composition a material which increases the solubility of thiourea. If the stabilized chlorinated hydrocarbon is used in a non-aqueous phosphatizing solution, the solubilizing agent for the phosphoric acid in the composition will also act to solubilize the thiourea. Similarly, when the stabilized chlorinated hydrocarbon is used in an acidic paint or other film forming composition, the solvents in such composition may also serve as solubilizers for the thiourea. In addition to the thiourea stabilizer and the solubilizing agent, other materials may also be added to the chlorinated hydrocarbon solvent, provided that they do not interfere with the action of the thiourea. Such additional materials may include additional stabilizers for the chlorinated hydrocarbon solvent, such as those which have been set forth hereinabove, and the like.

The chlorinated hydrocarbon solvents which may be stabilized against decomposition in acidic solutions containing phosphate ions include those which may be normally employed as degreasing solvents. Exemplary of those which may be used are the chlorinated lower aliphatic hydrocarbons, such as trichloroethylene, perchloroethylene, trichloroethanes, tetrachloroethanes, methylenechloride, ethylenechloride, ethylidenechloride, dichlorotetrafluoroethanes, trichlorotrifluoroethanes, trichlorodifluoroethanes, tetrachlorodifluoroethanes, fluorotrichloromethane, fluoropentachloroethane, methyltrichloroethylene, 1,2-dichloropropane, 1,2-dichloropropene, 1,1,2-trichloropropane, ethyltrichloroethylene and mixtures thereof. As will be noted, they are usually of 1 to 4 carbon atoms and 1 to 6 halogen atoms. Of these, the preferred chlorinated hydrocarbon solvent is trichloroethylene and for this reason, hereinafter, specific reference will be made to this compound.

As has been indicated hereinabove, the thiourea stabilized chlorinated hydrocarbon solvents, such as trichloroethylene, are particularly useful in formulating non-aqueous phosphatizing solutions. In addition to the trichloroethylene, such phosphatizing solutions will contain orthophosphoric acid and a solubilizing agent for the phosphoric acid. Additionally, materials which act as coating inhibitors or control agents may also be present in the phosphatizing solution. The chlorinated hydrocarbon, stabilized with thiourea in the amount as set forth hereinabove, is generally present in the phosphatizing composition in an amount within the range of about 65 to about 99 percent by weight of the total composition. The orthophosphoric acid used in formulating the phosphatizing solution is preferably of a high concentration, as for example, the 85 percent phosphoric acid of commerce. More dilute or more concentrated acid solution may be employed, however, if desired. The amount of phosphoric acid present in the phosphatizing composition will be at least that amount which will be sufficient to effect phosphatizing of the metals introduced into the solution. This "phosphatizing proportion" of phosphoric acid is generally within the range of about 0.1 to about 6 percent by weight of the total phosphatizing solution.

Inasmuch as phosphoric acid is substantially insoluble in the chlorinated hydrocarbons, such as trichloroethylene, a solubilizing agent is employed to dissolve the phosphoric acid as well as the thiourea in the trichloroethylene. Typical examples of suitable materials include aliphatic or alicyclic alcohols which contain between about 1 and about 18 carbon atoms in a molecule thereof, such as methanol, ethanol, normal propyl alcohol, isopropyl alcohol, normal butyl alcohol, isobutyl alcohol, tertiary butyl alcohol, tertiary amyl alcohol, octyl alcohol, decyl alcohol, lauryl alcohol, stearyl alcohol, cyclohexyl alcohol, and mixtures thereof. Other solubilizing agents capable of dissolving the phosphoric acid and thiourea in trichloroethylene may be used in place of or in addition to the above alcoholic agents. Such solubilizing agents include acid alkyl phosphates, such as octyl acid phosphate; halogenated alcohols, such as 2-chloroethanol; alkyl acetates such as ethyl acetate, amyl acetate and the like; amides such as N,N-dimethyl formamide and dimethyl acetamide; dioxane; monoethers of polyalkylene oxide glycols, such as the cellosolves and carbitols; ketones such as acetone and methyl ethyl ketone; and dialkyl sulfoxides, such as dimethyl sulfoxide.

These solubilizing agents are generally present in amounts within the range of about 1 to about 35 percent by weight of the total phosphatizing solution and preferably are present in the range of 1.5 to 10 percent.

In addition to the above components, the phosphatizing solution may also contain other materials which are effective in inhibiting or controlling the amount of phosphate coating which is placed on the metal surface. Exemplary of such materials are nitrated organic compounds containing the nitro group, such as nitrobenzene; glacial acetic acid; and the alkyl thioureas, such as N,N'-diethylthiourea. In this regard, the thiourea which is added to the chlorinated hydrocarbon as a stabilizer, has also been found to be effective in controlling or inhibiting the phosphate coating which is placed on the metal surface. When coating compositions are used which contain only the thiourea stabilizer of the present invention, without any additional inhibiting or coating controlling agents, the phosphate coating produced on the metal surfaces is found to be smooth, uniform, hard, non-tacky, non-blistered, and microcrystalline in form. Accordingly, the thiourea additive of the present invention appears to serve the dual function of stabilizing the trichloroethylene from the decomposition caused in the acidic solution containing phosphate ions and also of acting as a coating inhibitor in controlling the phosphate coating which is placed on the metal surface. It is to be appreciated, however, that additional inhibiting or coating controlling agents, such as those set forth hereinabove, may also be added to the composition. Generally, such inhibiting or coating control agents are present in the composition in amounts within the range of about 0.0001 to about 6 percent by weight of the total composition.

In carrying out the phosphatizing of metal surfaces, using phosphatizing solutions containing the stabilized trichloroethylene of the present invention, the metal is first cleaned, using any suitable method. Preferably, the metal is cleaned with a chlorinated organic hydrocarbon solvent such as trichloroethylene, to remove oil and other extraneous materials. In this method, the trichloroethylene is maintained at or near its boiling point and the metal to be cleaned is contacted with the liquid phase and/or the vapor phase of the trichloroethylene. It has been found that the trichloroethylene used in this cleaning operation may be stabilized with any material effective in stabilizing trichloroethylene in degreasing operations. After the metal surface has been cleaned, either in trichloroethylene or in some other manner, it is contacted with a phosphatizing solution of the type as has been described hereinabove.

Any metal of the class capable of reacting with phosphoric acid to form the corresponding metal phosphate, may be coated using the procedure which is set forth hereinbelow. Exemplary of such metals are iron, aluminum, zinc, magnesium, cadmium, alloys containing these metals, and the like.

Generally, the degreased metal is contacted with the phosphatizing solution for a period of time up to about 30 minutes. Preferably, the contact time is between about 0.5 and about 15 minutes. During the time the metal is in contact with the phosphatizing solution, the solution is generally maintained at a temperature between about 20 degrees centigrade and the boiling point of the solution. Preferably, the temperature of the solution is within the range of about 55 to about 87 degrees centigrade, the higher temperatures generally being employed when shorter contact times are used.

Where it is desired, the phosphatized metal, after being removed from the phosphatizing solution, may be returned to the trichloroethylene degreasing solution for a final rinse to remove phosphatizing solutions. Generally, however, this step is not necessary inasmuch as the phosphatized metal is substantially dry when it is removed from the phosphatizing bath. The phosphatized metal article, with or without rinsing, can then be stored, subjected to further treatments, such as painting, lubricating and the like, or used as is.

In order that those skilled in the art may better understand the present invention and the manner in which it may be practiced, the following specific examples are given.

In these examples, a phosphatizing soultion was made up containing the following components in the following proportions:

| | Percent by volume |
|---|---|
| Trichloroethylene | 89 |
| n-Butyl alcohol | 10 |
| 85% orthophosphoric acid | 1 |

200 ml. samples of the above solution were placed in a series of 500 ml. flasks each containing 0.1 gm. of iron powder. To these test samples were added different stabilizers for the trichloroethylene. The flasks containing the solutions were each mounted on a heater adjacent to a 100 watt ultra-violet light. Each of the flasks was fitted with a reflux condenser which was connected to a gas washing bottle containing 200 ml. of distilled water. The solutions under test were heated under reflux for a period of four hours, during which time a stream of oxygen, at the rate of 170 ml. per minute was passed into each of the refluxing samples and exited through each of the wash bottles. The extent of the decomposition caused in each of the samples by the combined effects of heat, ultra-violet light, oxygen, moisture and the iron powder, was determined by titration of the acid in the wash bottles and determination of the chloride in an aliquot of the test sample. The total was expressed as milliliters of 1 N HCl formed. Using this procedure, the following results were obtained:

| Example | Additive | Mls. 1 N HCl Formed |
|---------|----------|---------------------|
| 1 | None | 16.90 |
| 2 | 0.03% triethylamine | 8.21 |
| 3 | 0.03% p-tert-butyl phenol | 6.60 |
| 4 | 0.03% thymol | 4.42 |
| 5 | 0.03% pentaphen | 5.79 |
| 6 | 0.03% phenol | 7.32 |
| 7 | 0.03% thiourea | 0.12 |

By a comparison of Example 1 with Examples 2 through 6, it is seen that although the use of conventional stabilizers for trichloroethylene does effect a reduction in the amount of HCl formed when compared to a sample containing no stabilizer, the amount of HCl formed is still sufficiently high as to show that there is a considerable decomposition of the trichloroethylene in acidic solutions containing phosphate ions. The amount of this decomposition is such that the thus-stabilized trichloroethylene is completely unsatisfactory for use in such compositions. In contrast, by comparing Example 7 with Examples 1 through 6, it is seen that when the trichloroethylene is stabilized with thiourea, the amount of HCl formed, is less than one-fiftieth of that formed when using conventional trichloroethylene stabilizers. From this, it is apparent that in an acidic solution containing phosphate ions, the thiourea is quite effective in preventing the decomposition of the trichloroethylene.

The above examples are seen clearly to show the advantageous results which are obtained by the addition of thiourea to a chlorinated hydrocarbon such as trichloroethylene, for use in an acidic solution containing phosphate ions.

While there have been described various embodiments of the invention, the compositions and methods described are not intended to be understood as limiting the scope of the invention, as it is realized that changes therewithin are possible, and it is further intended that each element recited in each of the following claims is to be understood as referring to all equivalent elements for accomplishing substantially the same results in substantially the same or equivalent manner, it being intended to cover the invention broadly in whatever form it may be utilized.

What is claimed is:
1. A composition comprising an acidic solution containing phosphate ions, a lower aliphatic chlorinated hydrocarbon, a stabilizing proportion of thiourea, and a solubilizing agent in an amount sufficient to make it possible to incorporate the thiourea in the composition.
2. The composition as claimed in claim 1 wherein the thiourea is present in an amount within the range of 0.0001 to 0.1 percent by weight of the chlorinated hydrocarbon.
3. A composition comprising an acidic solution containing phosphate ions, trichloroethylene, a stabilizing proportion of thiourea and a solubilizing agent in an amount sufficient to make it possible to incorporate the stabilizing proportion of thiourea in the composition.
4. The composition as claimed in claim 3 wherein the thiourea is present in an amount within the range of 0.0001 to 0.1 percent by weight of the trichloroethylene.
5. A phosphatizing solution containing a lower aliphatic chlorinated hydrocarbon, a phosphatizing proportion of orthophosphoric acid, a stabilizing proportion of thiourea and a solubilizing agent for the orthophosphoric acid and the thiourea.
6. The composition as claimed in claim 5 wherein the thiourea is present in an amount within the range of 0.0001 to 0.1 percent by weight of the chlorinated hydrocarbon.
7. A phosphatizing solution comprising trichloroethylene, a phosphatizing proportion of orthophosphoric acid, a stabilizing proportion of thiourea and a solubilizing agent for the orthophosphoric acid and the thiourea.
8. The composition as claimed in claim 7 wherein the thiourea is present in an amount within the range of 0.0001 to 0.1 percent by weight of the trichloroethylene.
9. A process for phosphate coating a metal of the class capable of reacting with phosphoric acid to form a metal phosphate, which comprises contacting the metal with a composition comprising a lower aliphatic chlorinated hydrocarbon, a phosphatizing proportion of orthophosphoric acid, a stabilizing proportion of thiourea and a minor proportion of a solubilizing agent for the orthophosphoric acid and the thiourea.
10. The process as claimed in claim 9 wherein the thiourea is present in an amount within the range of 0.0001 to 0.1 percent by weight of the chlorinated hydrocarbon.
11. A process for phosphate coating a metal of the class capable of reacting with phosphoric acid to form a metal phosphate, which comprises contacting the metal with a composition comprising trichloroethylene, a phosphatizing proportion of orthophosphoric acid, a stabilizing proportion of thiourea and a minor proportion of a solubilizing agent for the orthophosphoric acid, and the thiourea.
12. The process as claimed in claim 11 wherein the thiourea is present in an amount within the range of 0.0001 to 0.1 percent by weight of the trichloroethylene.

References Cited by the Examiner

UNITED STATES PATENTS

| | | | |
|---|---|---|---|
| 2,008,680 | 7/1935 | Carlisle et al. | 260—652.5 |
| 2,043,258 | 6/1936 | Missbach | 260—652.5 |
| 2,515,934 | 7/1950 | Verner et al. | 148—6.15 |
| 2,789,070 | 4/1957 | Copelin | 148—6.15 |

ALFRED L. LEAVITT, *Primary Examiner.*

RALPH S. KENDALL, RICHARD D. NEVIUS, *Examiners.*